United States Patent
Yoshida

(10) Patent No.: US 7,745,971 B2
(45) Date of Patent: Jun. 29, 2010

(54) DRIVING DEVICE AND OPTICAL APPARATUS

(75) Inventor: Hideo Yoshida, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/502,834

(22) Filed: Jul. 14, 2009

(65) Prior Publication Data

US 2010/0045139 A1 Feb. 25, 2010

(30) Foreign Application Priority Data

Aug. 19, 2008 (JP) ............................ P2008-210757

(51) Int. Cl.
*H01L 41/09* (2006.01)
(52) U.S. Cl. ..................................... 310/317
(58) Field of Classification Search .................. 310/317
See application file for complete search history.

(56) References Cited

U.S. PATENT DOCUMENTS

| 7,449,815 | B2* | 11/2008 | Sasaki ................... 310/323.09 |
| 2002/0057038 | A1* | 5/2002 | Shibatani .................... 310/317 |
| 2004/0012305 | A1* | 1/2004 | Heilig et al. ........... 310/323.17 |
| 2005/0259155 | A1* | 11/2005 | Okada .................... 348/207.99 |
| 2005/0275315 | A1* | 12/2005 | Manabe et al. ............... 310/328 |
| 2006/0257129 | A1* | 11/2006 | Shibatani ...................... 396/55 |
| 2007/0036533 | A1* | 2/2007 | Sasaki ......................... 396/75 |
| 2008/0068728 | A1* | 3/2008 | Westerweck et al. ........ 359/698 |
| 2008/0204905 | A1* | 8/2008 | Mizuno et al. .............. 359/813 |
| 2009/0001852 | A1* | 1/2009 | Ashizawa ............. 310/323.16 |
| 2009/0224630 | A1* | 9/2009 | Adachi et al. ............... 310/317 |

FOREIGN PATENT DOCUMENTS

JP 11-155292 A 6/1999

* cited by examiner

*Primary Examiner*—Thomas M Dougherty
(74) *Attorney, Agent, or Firm*—Birch, Stewart, Kolasch & Birch, LLP

(57) ABSTRACT

Disclosed is a driving device capable of stably operating a plurality of actuators.

Control units supply driving signals to piezoelectric elements to control actuators such that the actuators repeatedly change their operational states between a driving state and a stop state. In addition, the control units control the actuators to enter the stop state at different timings. As such, since the actuators enter the stop state at different timings, it is possible to reduce or prevent the situation that all of the actuators stop at the same time by shifting the use timing of a power supply circuit. In addition, it is possible to reduce or prevent the situation that all of the actuators are driven at the same time and a current is supplied to all the actuators at the same time.

2 Claims, 13 Drawing Sheets

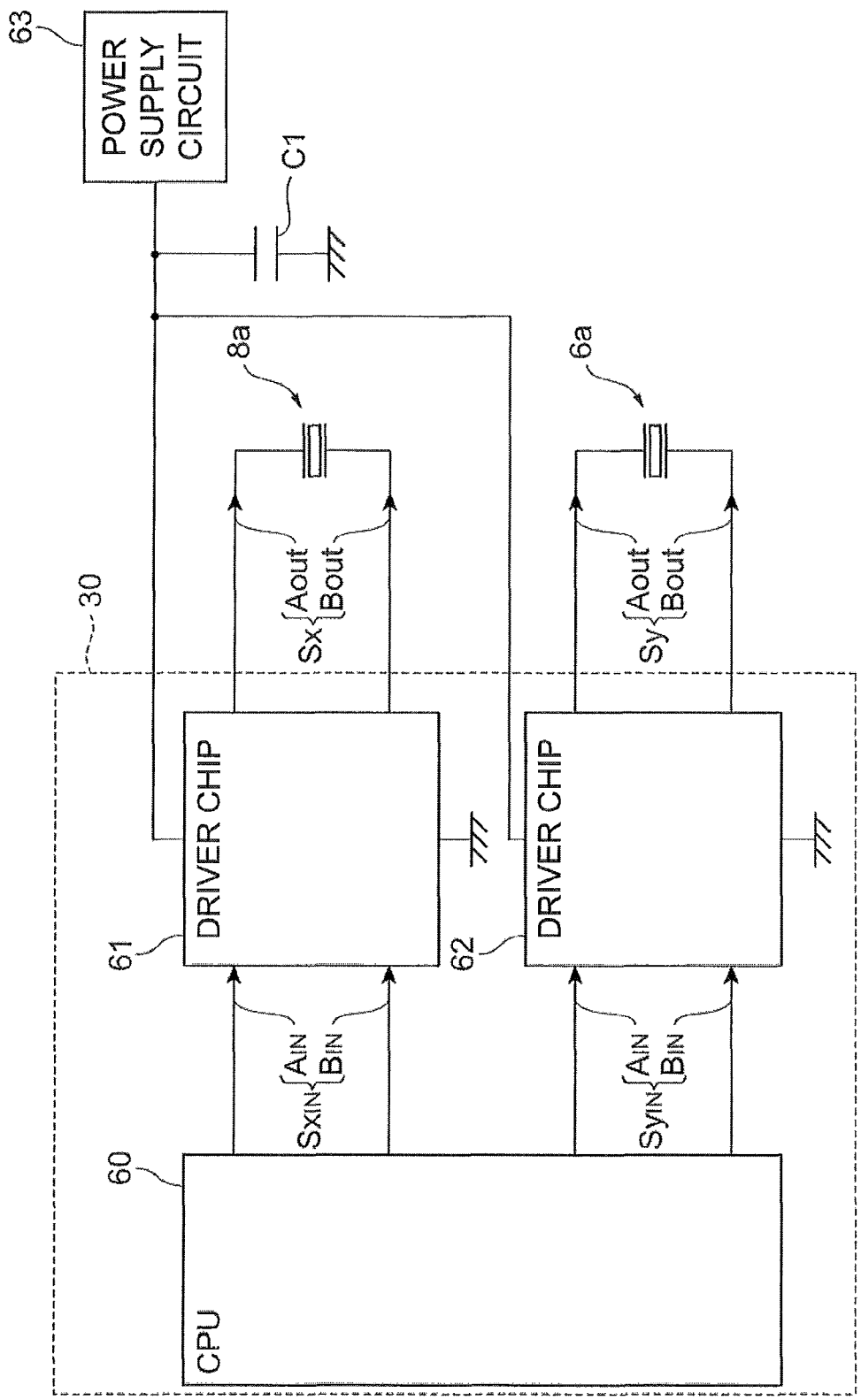

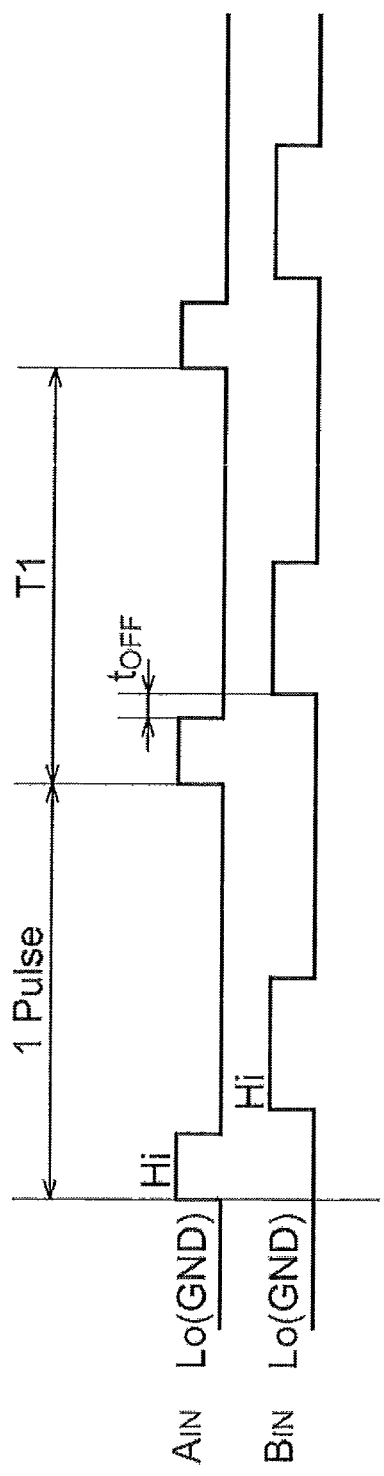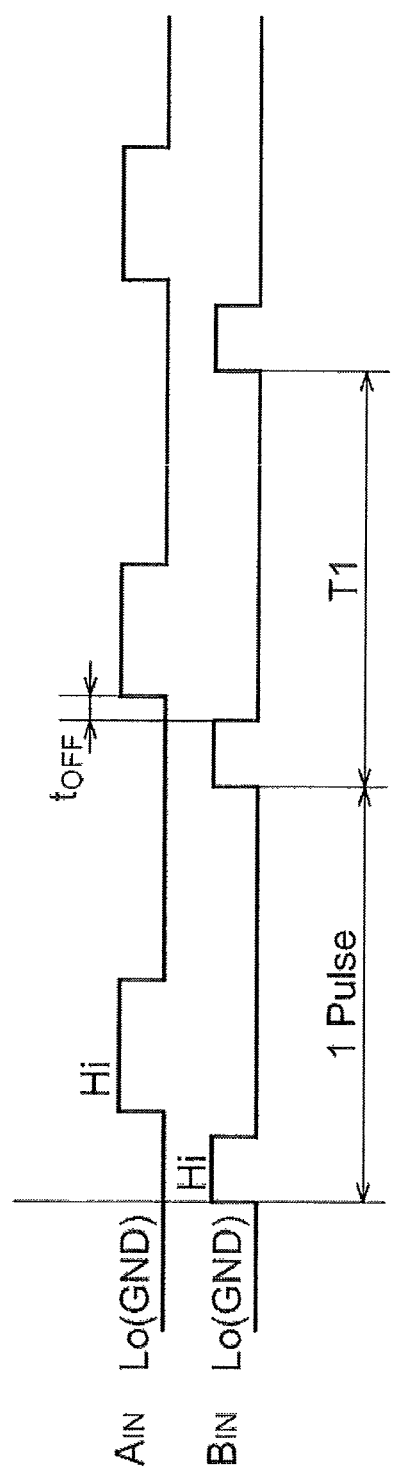

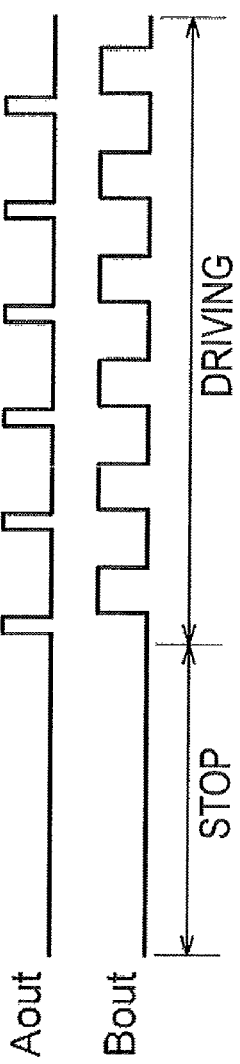
FIG.8A FIRST ACTUATOR DRIVING SIGNAL
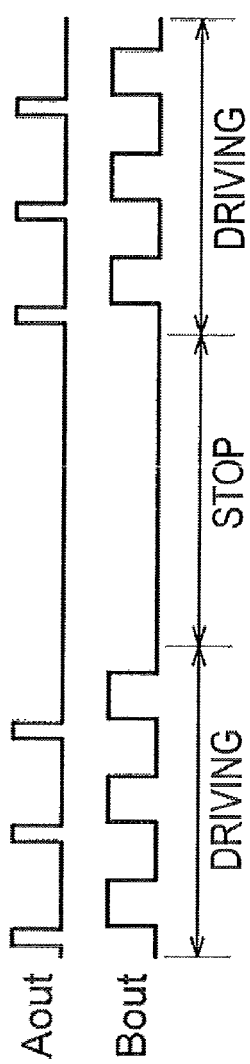
FIG.8B SECOND ACTUATOR DRIVING SIGNAL
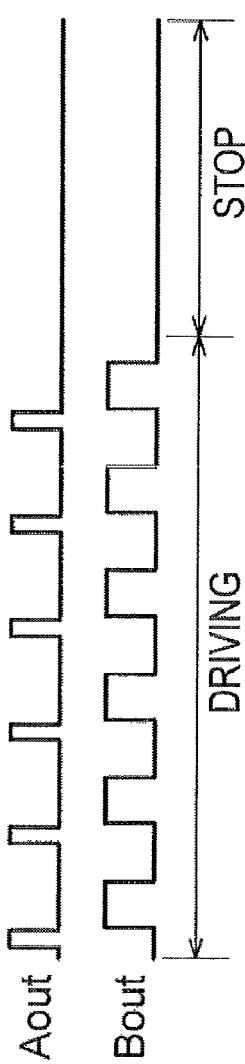
FIG.8C THIRD ACTUATOR DRIVING SIGNAL

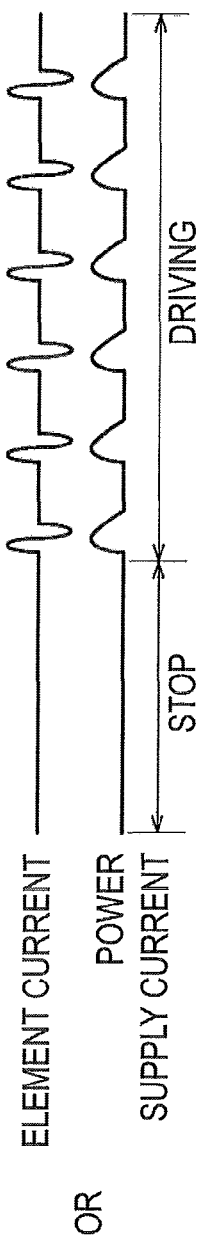
FIG.9A  FIRST ACTUATOR
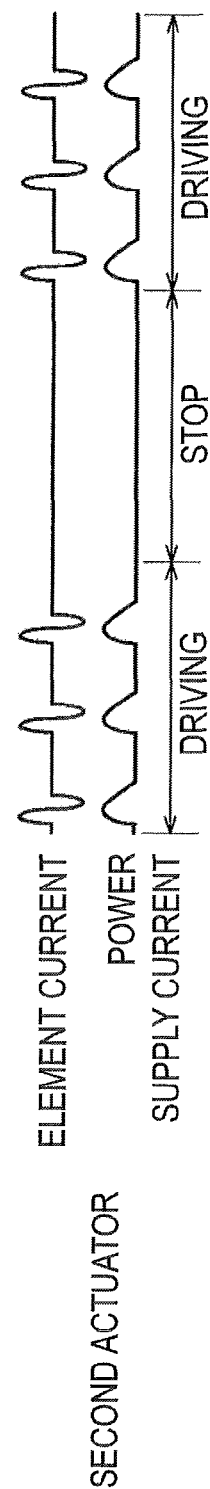
FIG.9B  SECOND ACTUATOR
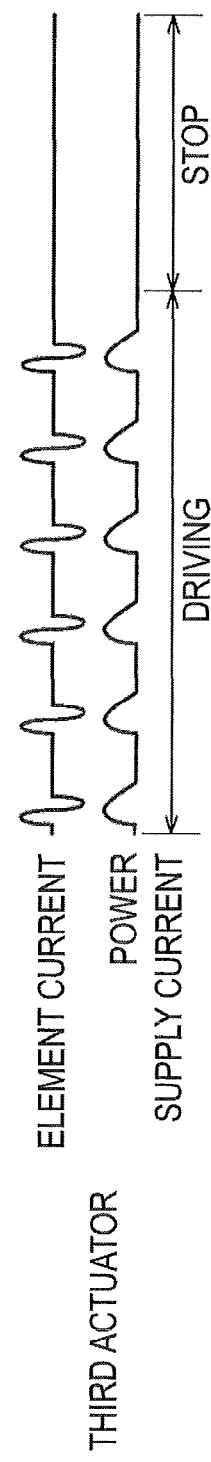
FIG.9C  THIRD ACTUATOR
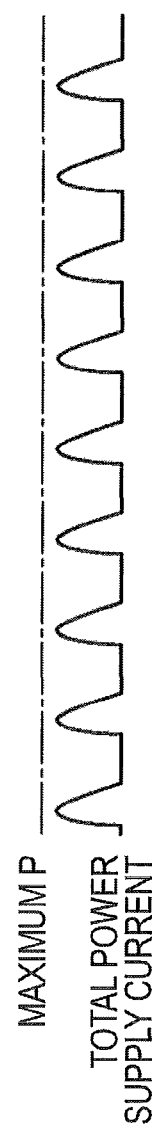
FIG.9D

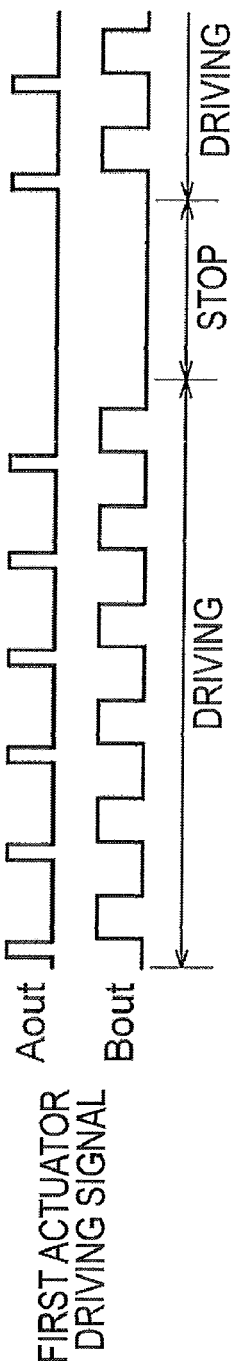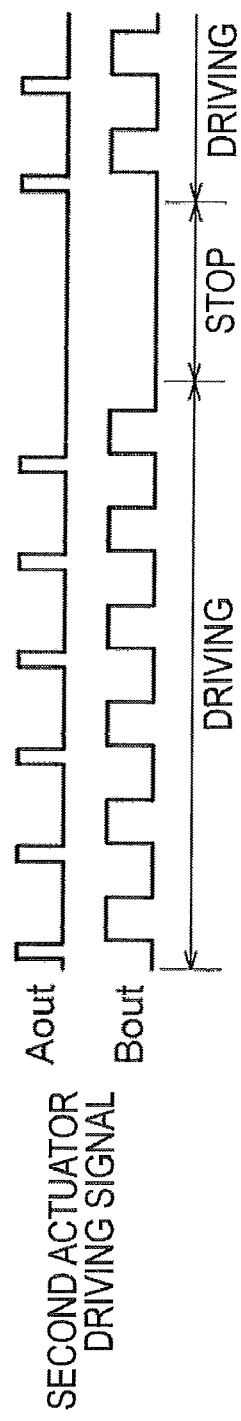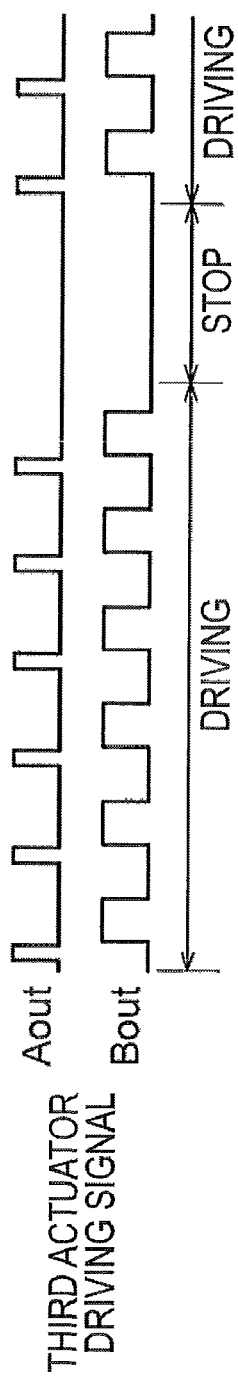

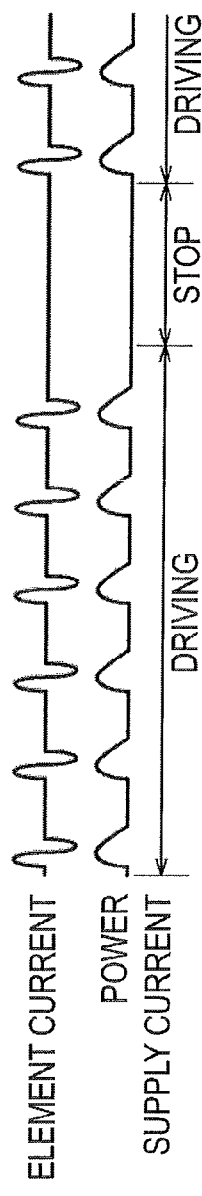
FIG.11A FIRST ACTUATOR
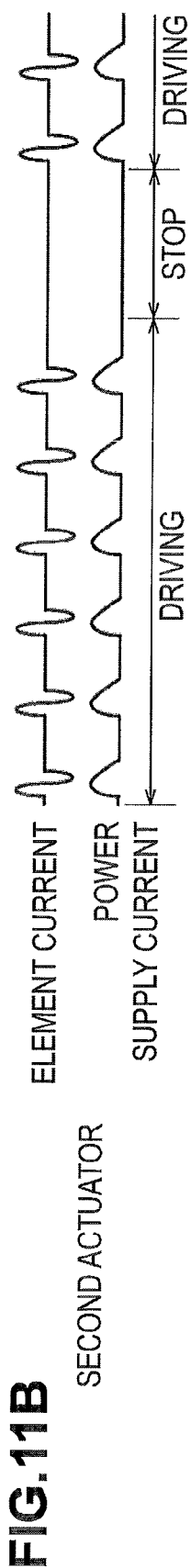
FIG.11B SECOND ACTUATOR
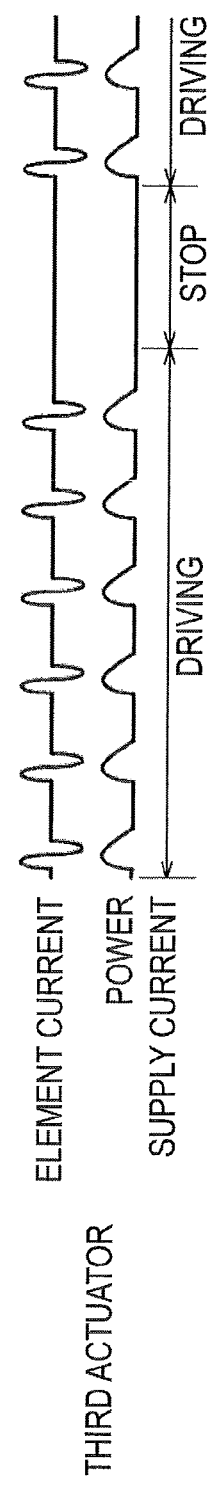
FIG.11C THIRD ACTUATOR
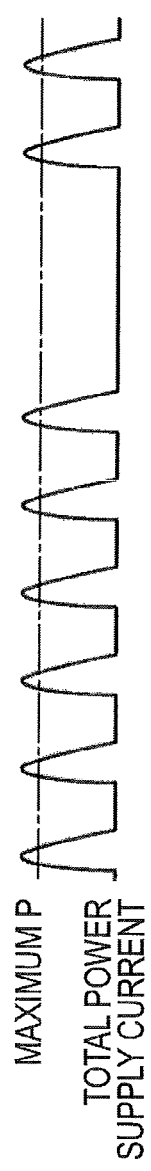
FIG.11D

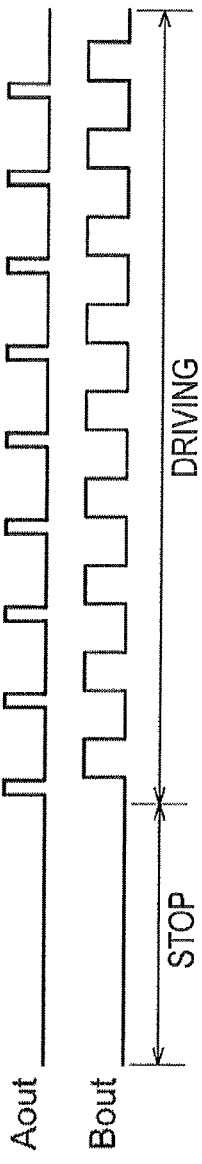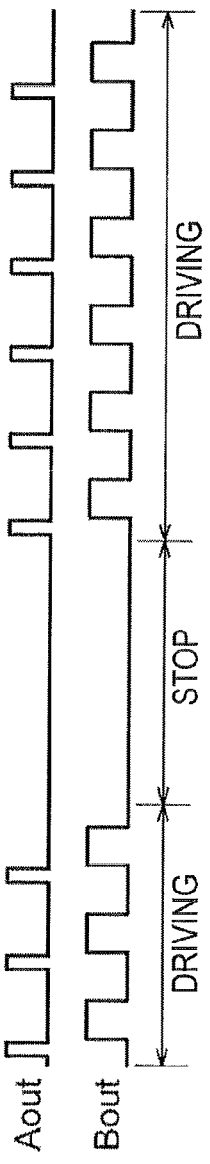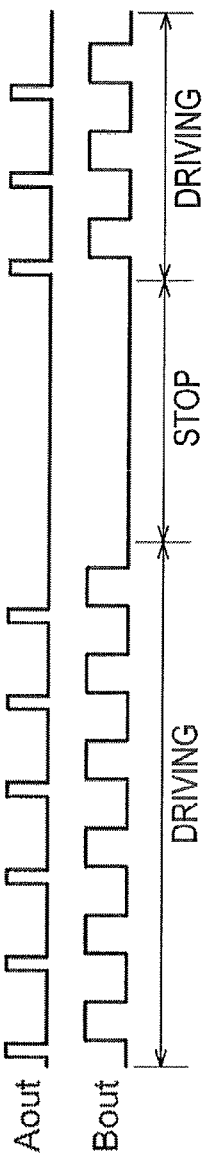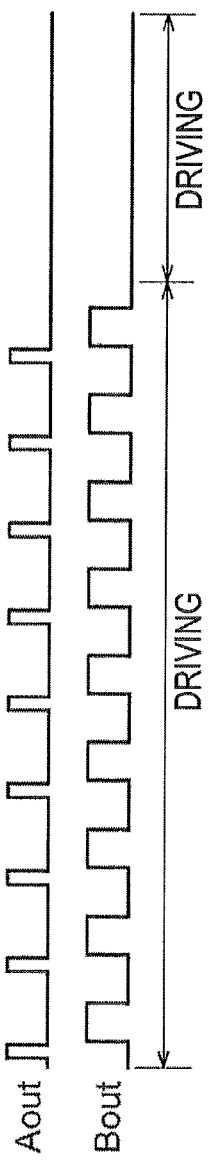

DRIVING DEVICE AND OPTICAL APPARATUS

CROSS-REFERENCE TO RELATED APPLICATIONS

This application is based upon and claims the benefit of priority from Japanese Patent Application No. 2008-210757 filed on Aug. 19, 2008; the entire contents of which are incorporated herein by reference.

BACKGROUND OF THE INVENTION

1. Field of the Invention

The present invention relates to a driving device that drives a driven member and an optical apparatus including the driving device.

2. Description of the Related Art

A driving device has been known which includes actuators, each having a piezoelectric element that is expanded or contracted in response to a driving signal, and outputs the driving signal to each of the actuators to move a driven member (for example, see JP-A-11-155292). The driving device disclosed in JP-A-11-155292 stores the waveforms of the driving signals, changes the waveforms of the driving signals on the basis of a driving direction and a driving speed, and supplies the changed driving signals to the piezoelectric elements, thereby controlling the actuators.

The driving device disclosed in JP-A-11-155292 adopts a control method of repeatedly changing the operational state of each actuator between a driving state and a stop state in order to precisely move the driven member. In addition, when only one driving state and only one stop state are arranged between movement amount check times, there is a large difference between an expected value and an actual movement amount. Therefore, the following control method (decimation driving) is considered: a plurality of pulse signals continuously input to an actuator are decimated at a predetermined timing to set a plurality of stop states, and a driving state and a stop state are repeated between movement amount check times to reduce the difference between an expected value and an actual movement amount.

However, when the above-mentioned decimation driving method is applied to the driving device disclosed in JP-A-11-155292 to control a plurality of actuators at the same time, in the stop state, no current is consumed by the driving device. However, in the driving state, a current is supplied to all the actuators at the same time, and the instantaneous current consumed by the entire driving device is increased. As a result, the current consumption of a power supply becomes unstable, and the operation of the actuator becomes unstable.

SUMMARY OF THE INVENTION

The invention has been made in order to solve the above-mentioned problems, and an object of the invention is to provide a driving device and an optical apparatus capable of stably operating a plurality of actuators.

According to an aspect of the invention, a driving device includes: a first actuator including a first piezoelectric element that is expanded and contracted in response to a driving signal and a first driving shaft that is attached to the first piezoelectric element and is reciprocated by the expansion and contraction operation of the first piezoelectric element, the first actuator moving a first driven member frictionally engaged with the first driving shaft; a second actuator including a second piezoelectric element that is expanded and contracted in response to a driving signal and a second driving shaft that is attached to the second piezoelectric element and is reciprocated by the expansion and contraction operation of the second piezoelectric element, the second actuator moving a second driven member frictionally engaged with the second driving shaft; and a driving signal control unit that supplies the driving signals to the first piezoelectric element and the second piezoelectric element such that each of the first actuator and the second actuator repeatedly changes its operational state between a driving state and a stop state. The driving signal control unit supplies the driving signals such that the first actuator and the second actuator start to be driven or stop at different timings.

According to the driving device of the above-mentioned aspect of the invention, the driving signal control unit supplies the driving signals to the first piezoelectric element and the second piezoelectric element such that each of the first actuator and the second actuator repeatedly changes its operational state between a driving state and a stop state and the actuators start to be driven or stop at different timings. As such, since the actuators start to be driven or stop at different timings, it is possible to shift the use time of the power supply circuit to reduce or prevent the situation that all the actuators stop at the same time. In addition, it is possible to reduce or prevent the situation that all the actuators are driven at the same time and a current is supplied to all the actuators at the same time. In this way, it is possible to prevent an increase in the maximum instantaneous current consumed by the entire driving device, and control the power supply to consume an average current. Therefore, it is possible to stably operate a plurality of actuators.

According to another aspect of the invention, an optical apparatus includes the above-mentioned driving device. Since the optical apparatus includes the above-mentioned driving device, it is possible to stably operate a plurality of actuators.

According to the above-mentioned aspects of the invention, it is possible to stably operate a plurality of actuators.

BRIEF DESCRIPTION OF THE DRAWINGS

FIG. 4 is a diagram schematically illustrating the electrical structure of the first control unit of a driving device shown in FIG. 3;

FIGS. 5A and 5B are diagrams illustrating the waveforms of input signals input to driver chips shown in FIG. 4;

FIGS. 8A to 8C are diagrams illustrating the waveforms of the driving signals output from the control unit of the driving device according to the embodiment of the invention;

FIGS. 9A to 9D are diagrams illustrating element currents and power supply currents corresponding to the driving signals shown in FIGS. 8A to 8C;

FIGS. 10A to 10C are diagrams illustrating the waveforms of driving signals output from a control unit of a driving device according to the related art;

FIGS. 11A to 11D are diagrams illustrating element currents and power supply currents corresponding to the driving signals shown in FIGS. 10A to 10C;

FIGS. 12A to 12D are diagrams illustrating the waveforms of driving signals output from a control unit of a driving device according to another embodiment of the invention.

DESCRIPTION OF THE PREFERRED EMBODIMENTS

Figure 1:
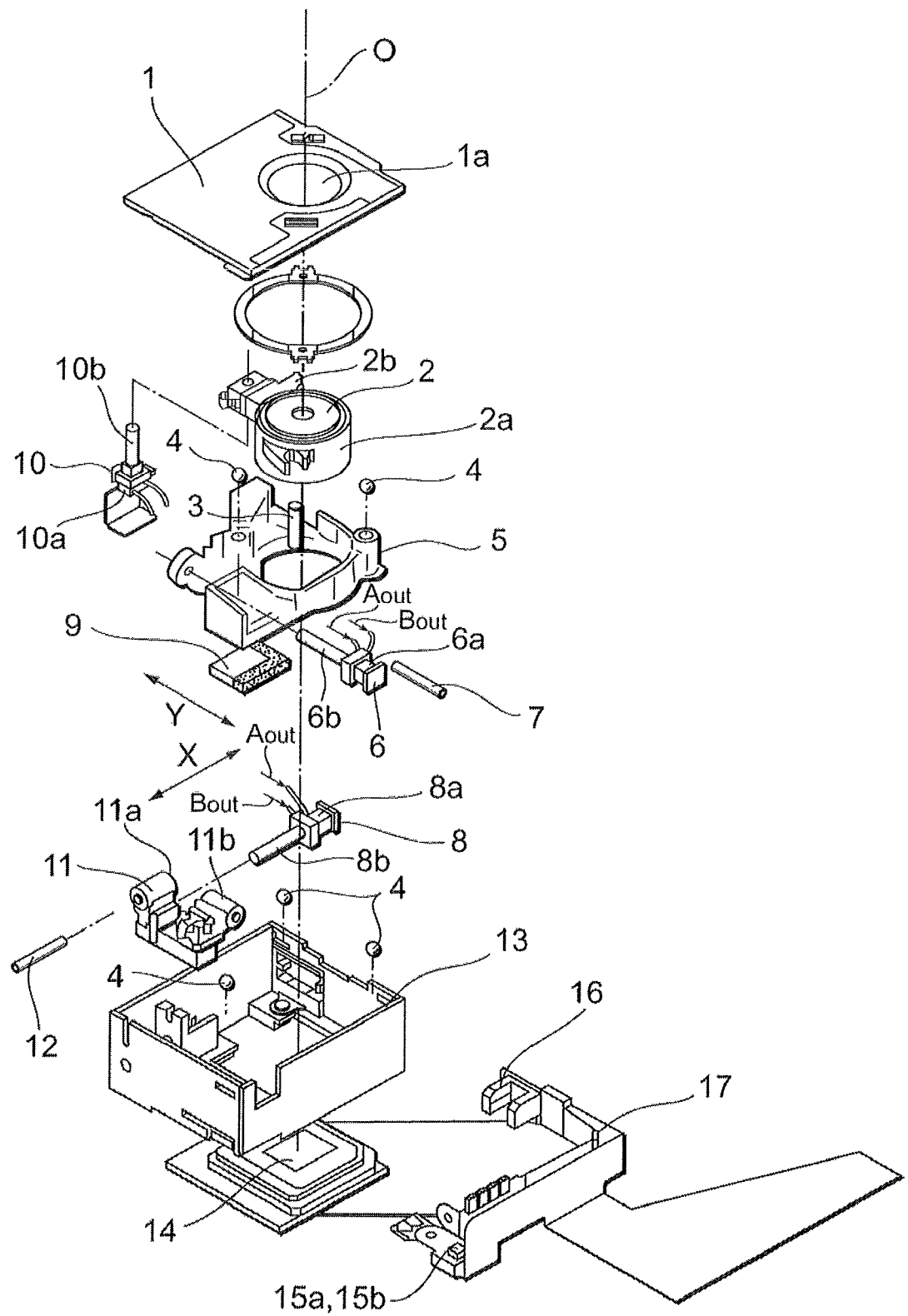
FIG. 1 is an exploded perspective view illustrating an imaging unit and a hand shake correction mechanism of an imaging apparatus according to an embodiment of the invention.

Hereinafter, exemplary embodiments of the invention will be described with reference to the accompanying drawings. In the drawings, the same or equivalent components are denoted by the same reference numerals, and a repeated description thereof will be omitted.

An imaging apparatus (optical apparatus) according to an embodiment of the invention moves, for example, an imaging optical system and an imaging device relative to each other in a direction orthogonal to an optical axis direction to correct hand shake. That is, the imaging apparatus moves the imaging optical system according to hand shake to change the relative position of the imaging optical system to the imaging device, thereby correcting the hand shake. The imaging apparatus is applied to, for example, a camera that captures a still picture, a video camera that captures a moving picture, and a camera provided in a mobile phone.

First, the mechanical structure of the imaging apparatus according to this embodiment will be described. FIG. 1 is an exploded perspective view illustrating an imaging unit and a hand shake correction mechanism of the imaging apparatus according to the embodiment of the invention. As shown in FIG. 1, the imaging apparatus according to this embodiment includes an imaging optical system 2 and an imaging device 14 that capture the image of a subject. The imaging optical system 2 is an optical system that focuses light on the imaging device 14, and includes an imaging lens. For example, the imaging optical system 2 is configured by accommodating a lens (not shown) in a holder 2a. The imaging optical system 2 may include a single lens, or it may include a lens group of a plurality of lenses.

The imaging optical system 2 is attached to a second moving member 5, and can be moved relative to the imaging device 14 in a direction orthogonal to the direction of an optical axis O (optical axis direction). The second moving member 5 is provided in an imaging device holder 13 for fixing the imaging device 14, and is supported by a sphere 4. The second moving member 5 can be moved relative to the imaging device holder 13 and the imaging device 14 in a direction orthogonal to the optical axis direction. Therefore, the imaging optical system 2 is moved together with the second moving member 5 relative to the imaging device 14 in the direction orthogonal to the optical axis direction.

In this case, it is preferable that the imaging optical system 2 be attached to the second moving member 5 so as to be movable in the optical axis direction. For example, a supporting shaft 3 extending in the optical axis direction is attached to the second moving member 5, and the imaging optical system 2 is attached to the second moving member 5 so as to be movable along the supporting shaft 3. A third actuator 10 that moves the imaging optical system 2 in the optical axis direction includes a third driving shaft 10b that is reciprocated by the expansion and contraction of a third piezoelectric element 10a. The third actuator 10 serves as an actuator that moves the imaging optical system 2 in the optical axis direction. The third piezoelectric element 10a is attached to the second moving member 5, and the third driving shaft 10b is frictionally engaged with the imaging optical system 2. One end of the third driving shaft 10b comes into contact with the third piezoelectric element 10a, and is adhered thereto by, for example, an adhesive. The third driving shaft 10b is a long member, for example, a cylindrical member.

As a frictional engagement structure, for example, the following structure is used: a leaf spring brings the third driving shaft 10b into pressure contact with the holder 2a of the imaging optical system 2 with a predetermined pressing force; and when the third driving shaft 10b is moved, a predetermined frictional force is generated. When the third driving shaft 10b is moved with a force more than the frictional force, the position of the imaging optical system 2 is maintained by inertia. On the other hand, when the third driving shaft 10b is moved in the opposite direction with a force equal to or less than the frictional force, the imaging optical system 2 is also moved in the opposite direction. It is possible to move the imaging optical system 2 relative to the second moving member 5 by repeatedly reciprocating the third driving shaft 10b. A control unit (not shown) inputs an electric signal that makes the expansion velocity of the third piezoelectric element 10a different from the contraction velocity thereof to the third piezoelectric element 10a. In this way, the third driving shaft 10b is reciprocated at different speeds, and it is possible to control the movement of the imaging optical system 2.

As described above, the imaging optical system 2 is attached to the second moving member 5 so as to be movable in the optical axis direction. Therefore, it is possible to move only the imaging optical system 2 relative to the second moving member 5 in the optical axis direction to perform focusing.

The imaging device 14 is an imaging unit that converts an image formed by the imaging optical system 2 into an electric signal, and is fixedly attached to the imaging device holder 13. For example, a CCD sensor is used as the imaging device 14.

The imaging apparatus according to this embodiment includes a first actuator 8 and a second actuator 6. The first actuator 8 moves the imaging optical system 2 relative to the imaging device 14 in a yaw direction X orthogonal to the optical axis direction. The first actuator 8 includes, for example, a first driving shaft 8b that is reciprocated by the expansion and contraction of a first piezoelectric element 8a. The first driving shaft 8b is arranged in the yaw direction X. The first piezoelectric element 8a is attached to the imaging device holder 13 to which the imaging device 14 is fixed. The first driving shaft 8b is frictionally engaged with a first moving member 11. One end of the first driving shaft 8b comes into contact with the first piezoelectric element 8a, and is adhered thereto by, for example, an adhesive. The first driving shaft 8b is a long member, for example, a cylindrical member.

As a frictional engagement structure, for example, the following structure is used: a leaf spring brings the first driving shaft 8b into pressure contact with the first moving member 11 with a predetermined pressing force; and when the first driving shaft 8b is moved, a predetermined frictional force is generated. When the first driving shaft 8b is moved with a force more than the frictional force, the position of the first moving member 11 is maintained by inertia. On the other hand, when the first driving shaft 8b is moved in the opposite direction with a force equal to or less than the frictional force, the first moving member 11 is also moved in the opposite direction. It is possible to move the first moving member 11 relative to the imaging device 14 in the yaw direction X by repeatedly reciprocating the first driving shaft 8b. Therefore, it is possible to move the imaging optical system 2 relative to the imaging device 14 in the yaw direction X. A control unit (not shown) inputs an electric signal that makes the expansion velocity of the first piezoelectric element 8a different from the contraction velocity thereof to the first piezoelectric element 8a. In this way, the first driving shaft 8b is reciprocated at different speeds, and it is possible to control the movement of the imaging optical system 2.

The first actuator 8 may be configured such that the first piezoelectric element 8a is attached to the first moving member 11 and the first driving shaft 8b is frictionally engaged with the imaging device holder 13.

The second actuator 6 moves the imaging optical system 2 relative to the imaging device 14 in a pitch direction Y orthogonal to the optical axis direction. The second actuator 6 and the first actuator 8 serve as a driving unit (driving device) that moves the imaging optical system 2 and the imaging device 14 relative to each other.

The pitch direction Y is orthogonal to the optical axis direction and intersects the yaw direction X. The second actuator 6 includes, for example, a second driving shaft 6b that is reciprocated by the expansion and contraction of a second piezoelectric element 6a. The second driving shaft 6b is arranged in the pitch direction Y. The second piezoelectric element 6a is attached to the second moving member 5. The second driving shaft 6b is frictionally engaged with the first moving member 11. One end of the second driving shaft 6b comes into contact with the second piezoelectric element 6a, and is adhered thereto by, for example, an adhesive. The second driving shaft 6b is a long member, for example, a cylindrical member.

As a frictional engagement structure, for example, the following structure is used: a leaf spring brings the second driving shaft 6b into pressure contact with the first moving member 11 with a predetermined pressing force; and when the second driving shaft 6b is moved, a predetermined frictional force is generated. When the second driving shaft 6b is moved in one direction with a force more than the frictional force, the position of the second moving member 5 is maintained by inertia. On the other hand, when the second driving shaft 6b is moved in the opposite direction with a force equal to or less than the frictional force, the second driving shaft 6b stops by the frictional force, and the second moving member 5 is moved in the one direction. It is possible to move the second moving member 5 relative to the imaging device 14 in the pitch direction Y and move the imaging optical system 2 relative to the imaging device 14 in the pitch direction Y by repeatedly reciprocating the second driving shaft 6b. A control unit (not shown) inputs an electric signal that makes the expansion velocity of the second piezoelectric element 6a different from the contraction velocity thereof to the second piezoelectric element 6a. In this way, the second driving shaft 6b is reciprocated at different speeds, and it is possible to control the movement of the imaging optical system 2.

The second actuator 6 is attached to the first moving member 11 by the above-mentioned frictional engagement. Therefore, when the first actuator 8 is operated to move the first moving member 11 in the yaw direction X, the second actuator 6 is also moved in the yaw direction X.

The second actuator 6 may be configured such that the second piezoelectric element 6a is attached to the first moving member 11 and the second driving shaft 6b is frictionally engaged with the second moving member 5.

The imaging apparatus is provided with a position detecting magnet 9, and Hall elements 15a and 15b. The position detecting magnet 9 is attached to the second moving member 5, and may have any structure as long as it generates a magnetic field detected by the Hall elements 15a and 15b. The Hall elements 15a and 15b are magnetic sensors that detect the relative position between the imaging device 14 and the imaging optical system 2 in a direction orthogonal to the optical axis direction on the basis of the state of the magnetic field generated by the position detecting magnet 9, and are mounted to, for example, a substrate 17. The Hall elements 15a and 15b can detect the relative position in the direction orthogonal to the optical axis direction. The substrate 17 is a wiring substrate that is attached to the imaging device holder 13, and is bent in, for example, an L shape. The lead lines of the piezoelectric elements 6a, 8a, and 10a are connected to the substrate 17.

The imaging apparatus further includes a photo interrupter 16. The photo interrupter 16 is a position detecting sensor that detects the position of the imaging optical system 2. The photo interrupter 16 is mounted to the substrate 17 and is arranged in the vicinity of the imaging optical system 2. The photo interrupter 16 includes a light emitting unit and a light receiving unit, and detects the position of a moving piece 2b passing between the light emitting unit and the light receiving unit to detect the position of the imaging optical system 2 in the optical axis direction. The moving piece 2b is formed in the holder 2a of the imaging optical system 2, and is moved integrally with the imaging optical system 2.

The imaging apparatus further includes an upper cover 1. The upper cover 1 covers an opening portion of the imaging device holder 13 that accommodates the imaging unit and the hand shake correction mechanism, and an opening portion 1a through which a subject image is incident is formed in the upper cover 1.

The first moving member 11 is supported by a first supporting shaft 12 so as to be movable in the yaw direction X. The first supporting shaft 12 is a shaft member arranged in the yaw direction X, and is attached to the imaging device holder 13. The first supporting shaft 12 is provided so as to pass through a bearing portion 11a of the first moving member 11. In this way, the first moving member 11 is supported by the first supporting shaft 12 so as to be moved relative to the imaging device 14 only in the yaw direction X.

The second moving member 5 is supported by a second supporting shaft 7 so as to be movable in the pitch direction Y. The second supporting shaft 7 is a shaft member arranged in the pitch direction Y, and is attached to the second moving member 5. The second supporting shaft 7 is provided so as to pass through a bearing portion 11b of the first moving member 11. In this way, the second moving member 5 is supported by the second supporting shaft 7 so as to be moved relative to the first moving member 11 only in the pitch direction Y.

Figure 2:
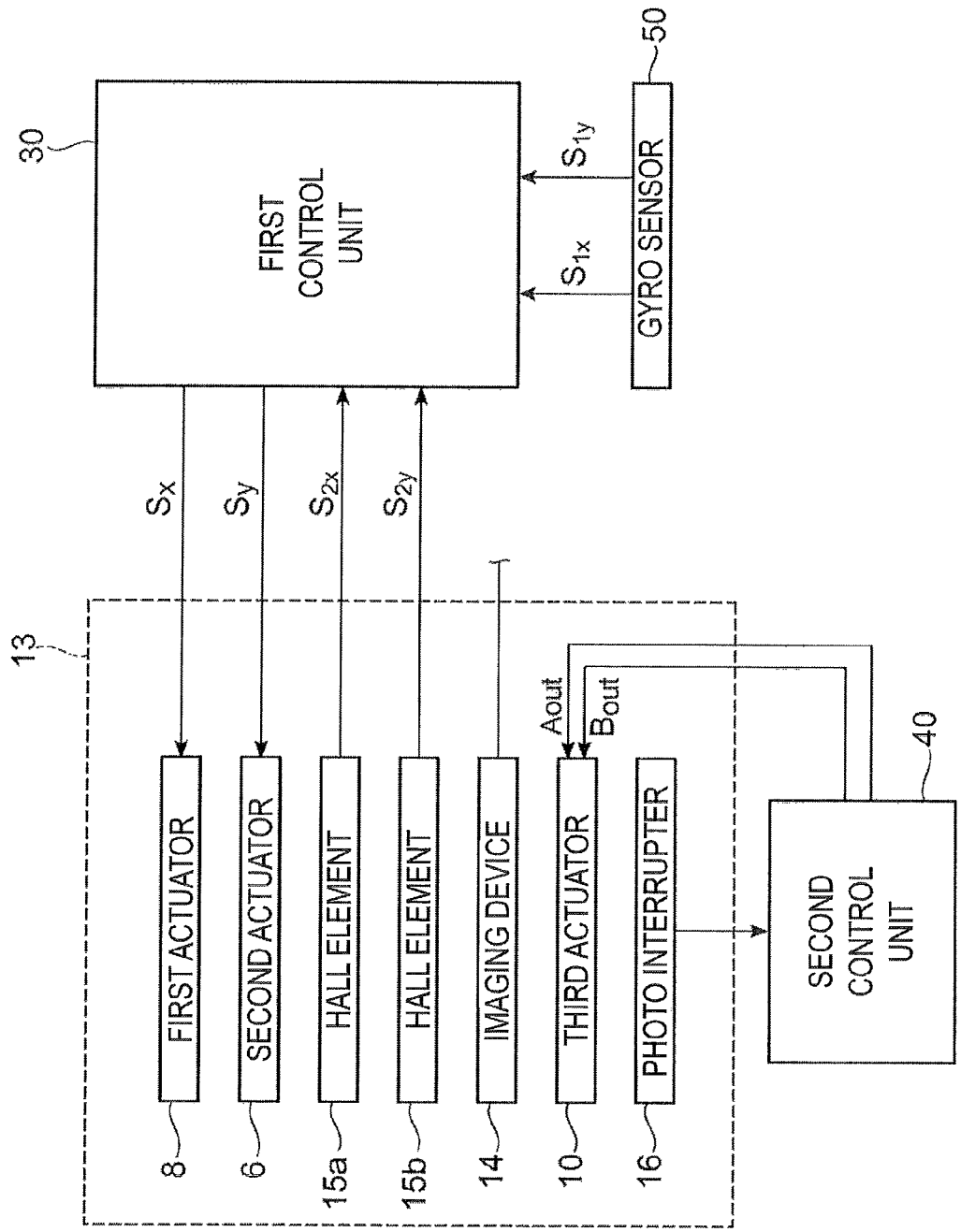
FIG. 2 is a block diagram illustrating the electrical structure of the imaging apparatus according to the embodiment of the invention.

Next, the electrical structure of the imaging apparatus according to this embodiment will be described. FIG. 2 is a block diagram illustrating the electrical structure of the imaging apparatus according to this embodiment.

As shown in FIG. 2, the imaging apparatus according to this embodiment includes a first control unit (driving signal control unit) 30. The first control unit 30 serves as a control unit that controls the relative movement between the imaging optical system 2 and the imaging device 14 in a direction orthogonal to the optical axis direction to correct hand shake. The first control unit 30 is composed of, for example, an LSI (large scale integration) including a CPU and a driver chip, which will be described in detail below. A gyro sensor 50 connected to the first control unit 30 serves as a hand shake detecting sensor that detects a hand shake amount. The gyro sensor 50 is provided outside an antivibration unit, that is, the imaging device holder 13.

The first control unit 30 receives a detection signal S1$x$ of the gyro sensor 50 and a detection signal S2$x$ of the Hall element 15$a$, and outputs a driving signal Sx to the first actuator 8. The detection signal S1$x$ of the gyro sensor 50 is related to a hand shake amount in the yaw direction X (X direction). The detection signal S2$x$ of the Hall element 15$a$ is related to the relative position between the imaging device 14 and the imaging optical system 2 in the yaw direction X.

The first control unit 30 receives a detection signal S1$y$ of the gyro sensor 50 and a detection signal S2$y$ of the Hall element 15$b$, and outputs a driving signal Sy to the second actuator 6. The detection signal S1$y$ of the gyro sensor 50 is related to a hand shake amount in the pitch direction Y (Y direction). The detection signal S2$y$ of the Hall element 15$b$ is related to the relative position between the imaging device 14 and the imaging optical system 2 in the pitch direction Y.

A second control unit (driving signal control unit) 40 connected to a third actuator 10 serves as a control unit that controls the movement of the imaging optical system 2 in the optical axis direction. The second control unit 40 is composed of, for example, an auto focus IC or a microcomputer. The second control unit 40 acquires information of the distance to a subject from a measuring device (not shown), and outputs a driving signal to the third actuator 10 on the basis of the distance information and the detection signal of the photo interrupter 16 to control the movement of the imaging optical system 2.

Figure 3:
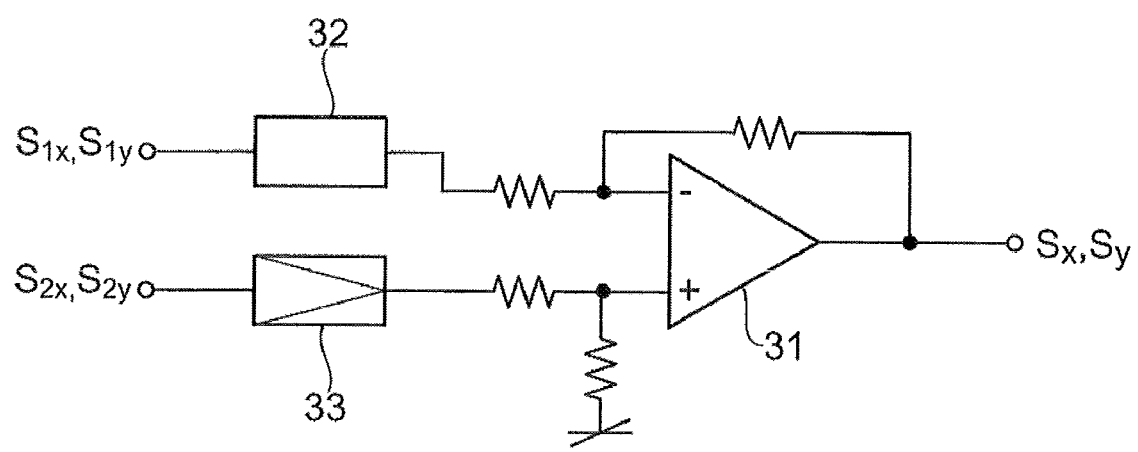
FIG. 3 is a diagram schematically illustrating a hand shake correction circuit of a first control unit shown in FIG. 2.

Next, a hand shake correction signal generating function of the first control unit 30 will be described. FIG. 3 is a diagram illustrating a hand shake correction circuit of the imaging apparatus according to this embodiment. For example, as shown in FIG. 3, two hand shake correction circuits, each using a differential amplifier 31, are provided in the first control unit 30. The two hand shake correction circuits correct hand shake in the X direction and the Y direction. The hand shake correction circuit correcting hand shake in the X direction generates the driving signal Sx of the first actuator 8 on the basis of the difference between the detection signal S1$x$ of the gyro sensor 50 and the detection signal S2$x$ of the Hall element 15$a$. The hand shake correction circuit correcting hand shake in the Y direction generates the driving signal Sy of the second actuator 6 on the basis of the difference between the detection signal S1$y$ of the gyro sensor 50 and the detection signal S2$y$ of the Hall element 15$b$. In this way, it is possible to reduce the difference between a hand shake amount and the relative movement between the imaging optical system 2 and the imaging device 14 to correct the hand shake.

It is preferable that the detection signals S1$x$ and S1$y$ of the gyro sensor 50 be integrated by an integrating circuit 32 and then input to the differential amplifier 31. In addition, it is preferable that the detection signals S2$x$ and S2$y$ of the Hall elements 15$a$ and 15$b$ be amplified by the amplifying circuit 33 and then input to the differential amplifier 31.

Next, a driving signal output function of the first control unit 30 will be described in detail. FIG. 4 is a diagram schematically illustrating the detailed electrical structure of the first control unit 30 of the imaging apparatus according to this embodiment. As shown in FIG. 4, the first control unit 30 includes, for example, a CPU 60 and driver chips 61 and 62. The driver chips 61 and 62 are provided to correspond to the first actuator 8 and the second actuator 6, respectively, and are connected to a common power supply circuit 63. A power supply capacitor C1 that stabilizes a power supply output is provided between the driver chips 61 and 62 and the power supply circuit 63.

The CPU 60 includes a clock circuit, and has a function of generating input signals SxIN and SyIN for outputting the driving signals Sx and Sy to the driver chips 61 and 62, respectively. The driver chips 61 and 62 are connected to the first piezoelectric element 8$a$ of the first actuator 8 and the second piezoelectric element 6$a$ of the second actuator 6, respectively, and serve as drive circuits. The driver chips 61 and 62 amplify the voltages or currents of the input signals SxIN and SyIN input from the CPU 60 to generate the driving signals Sx and Sy, and output the driving signals to the first piezoelectric element 8$a$ of the first actuator 8 and the second piezoelectric element 6$a$ of the second actuator 6, respectively. For example, each of the driver chips 61 and 62 has a logic circuit in an input stage and two field effect transistors (FETs) in an output stage. The two transistors can output a Hi output (high-potential output), a Lo output (low potential output), and an OFF output (open output) as output signals.

Next, the signals input to and output from the driver chips 61 and 62 will be described in detail. First, signals input to and output from the driver chip 61 will be described. FIGS. 5A and 5B show the input signal SxIN input to the driver chip 61, in which the horizontal axis indicates time. FIG. 5A shows the waveforms of input signals AIN and BIN (signals during forward rotation) when the first moving member 11 is moved in a direction in which it approaches the first piezoelectric element 8$a$, and FIG. 5B shows the waveforms of the input signals AIN and BIN (signals during backward rotation) when the first moving member 11 is moved in a direction in which it is separated from the first piezoelectric element 8$a$.

As such, the input signal SxIN output from the CPU 60 includes two pulse signals AIN and BIN. The two pulse signals AIN and BIN have the same frequency F1 (a period of T1) and different phases. Therefore, a potential difference between the pulse signals varies stepwise in one direction and varies rapidly in the opposite direction, or the potential difference between the pulse signals varies rapidly in one direction, and varies stepwise in the opposite direction. For example, in FIGS. 5A and 5B, the pulse signals are set such that, after one signal is changed from a Hi level to a Lo level, the other signal is changed to a Hi level. In the signals, after a predetermined time lag tOFF has elapsed from the transition of one signal to a Lo level, the other signal is changed to a Hi level.

Figure 6A:
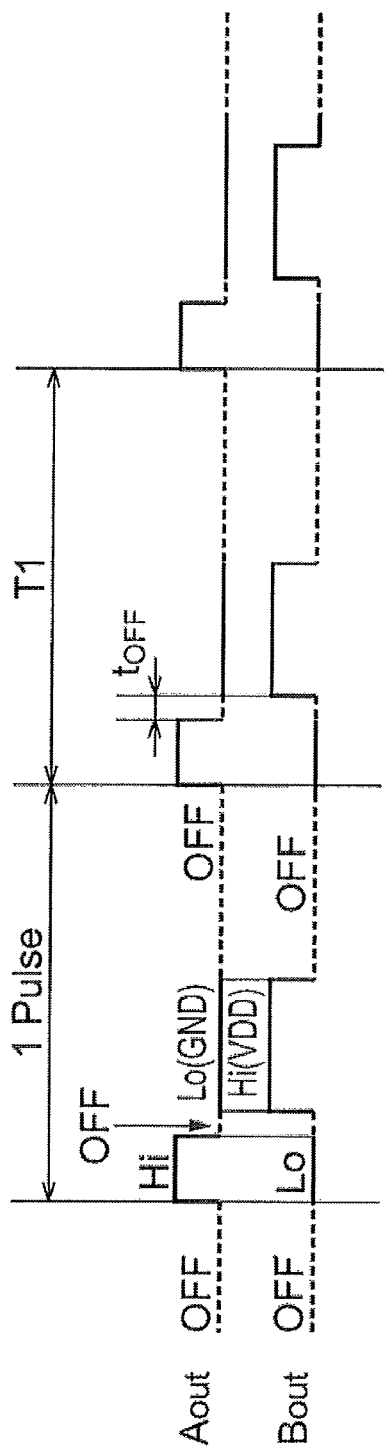
FIGS. 6A and 6B are diagrams illustrating the waveforms of driving signals output from the driver chips shown in FIG. 4.
Figure 6B:
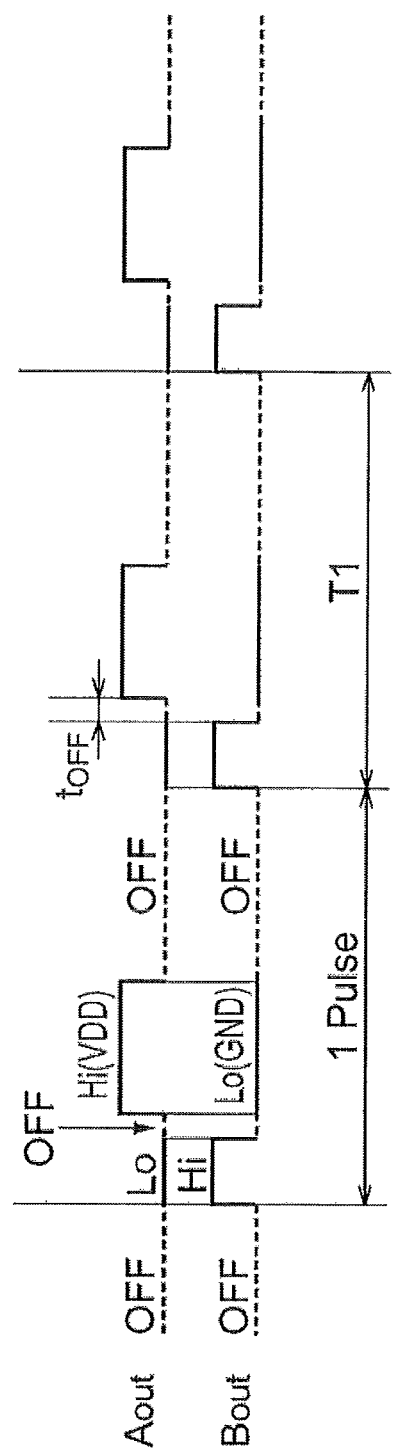

FIGS. 6A and 6B shows the waveform of the driving signal Sx output from the driver chip 61, in which the horizontal axis indicates time. The signals shown in FIGS. 6A and 6B are output on the basis of the input signals shown in FIGS. 5A and 5B when the first actuator 8 is driven. That is, FIG. 6A shows the waveforms of driving signals AOUT and BOUT (signals during forward rotation) output when the first moving member 11 is moved in the direction in which it approaches the first piezoelectric element 8$a$, and FIG. 6B shows the waveforms of the driving signals AOUT and BOUT (signals during backward rotation) when the first moving member 11 is moved in the direction in which it is separated from the first piezoelectric element 8$a$.

In FIGS. 6A and 6B, the two driving signals AOUT and BOUT, which are pulse signals, are input to two terminals (see FIG. 1) of the first piezoelectric element 8$a$, and form the driving signal Sx. The two pulse signals have the same frequency F1 (a period of T1) and different phases. Therefore, the potential difference between the pulse signals varies stepwise in one direction and varies rapidly in the opposite direction, or the potential difference between the pulse signals varies rapidly in one direction, and varies stepwise in the opposite direction. The potential difference between the driving signals AOUT and BOUT is the input voltage of the first piezoelectric element 8a. The first piezoelectric element 8a is expanded or contracted by the potential difference between the pulse signals. Each pulse of the signal is continuously input to the first actuator 8 to continuously drive the piezoelectric element (driving state).

For example, the driving signals AOUT and BOUT are set such that, after one signal is changed from a Hi level to a Lo level, the other signal is changed to a Hi level. In the signals, after a predetermined time lag tOFF has elapsed from the transition of one signal to a Lo level, the other signal is changed to a Hi level.

The driving signals AOUT and BOUT, that is, electric signals for operating the first piezoelectric element 8a have a frequency that is higher than an audio frequency. In FIGS. 6A and 6B, the frequency F1 of the two signals is higher than the audio frequency. For example, the frequency F1 is preferably in the range of 30 to 80 kHz, and more preferably, in the range of 40 to 60 kHz. The use of the signals in the above-mentioned frequency range makes it possible to reduce the operation noise of the piezoelectric element in the audible range.

Figure 7A:
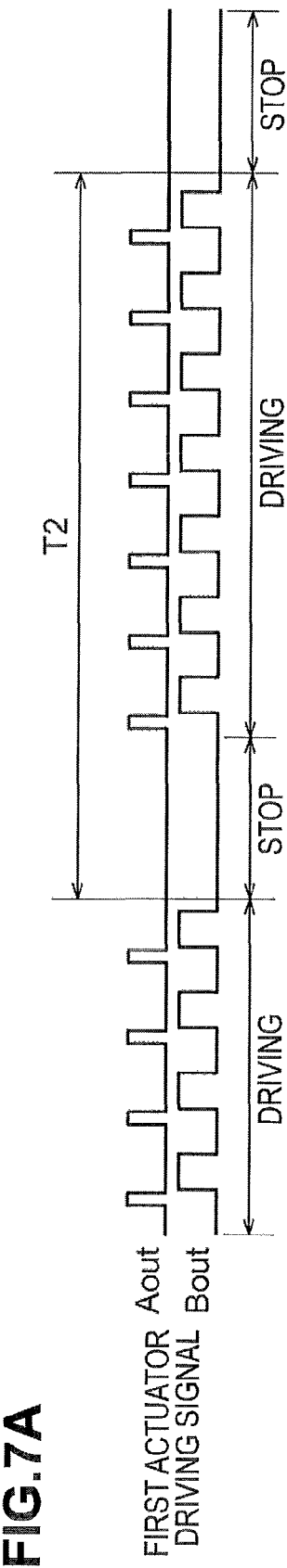
FIGS. 7A and 7B are diagrams illustrating the waveforms of the driving signals output from the first control unit shown in FIG. 4, and an element current and a power supply current corresponding to the driving signals, respectively.
Figure 7B:
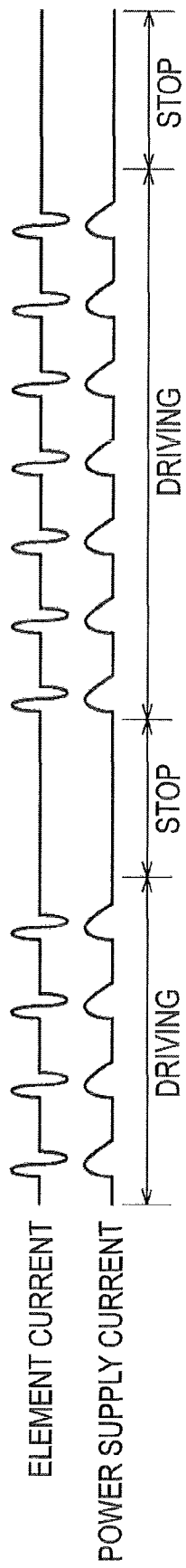

FIG. 7A shows the waveforms of the driving signals AOUT and BOUT of the first actuator 8, and FIG. 7B shows current values corresponding to the driving signals AOUT and BOUT shown in FIG. 7A. Specifically, FIG. 7B shows the element current of the first actuator 8 and the power supply current of the power supply circuit 63 that supplies the element current, in which the horizontal axis indicates time. In the driving control of the first actuator 8, as shown in FIG. 7A, while a plurality of pulse signals are continuously input to the first actuator 8 to continuously drive the first actuator 8, the pulse signal is decimated at a predetermined timing such that there is no difference between the voltages input to two terminals of the first piezoelectric element 8a, thereby setting a stop state. In this way, the first actuator 8 is controlled to repeat the driving state and the stop state. As such, the first actuator 8 repeats the driving state and the stop state to finely move the first moving member 11. As a result, it is possible to precisely move the first moving member 11. It is preferable that the length of the stop state be equal to or more than the period of one pulse of the input signal during driving as shown in FIGS. 6A and 6B. In addition, the pulse signal may be decimated periodically or at random. That is, the stop state may be set periodically or at random. In addition, it is preferable that the interval of the stop state (T2 in FIG. 7A) be out of the audio frequency.

Next, the signals input to or output from the driver chip 62 will be described. The input signals AIN and BIN of the driver chip 62 have the same amplitude, wavelength, frequency, and phase (or initial phase) as the signals output from the driver chip 61. The driving signals AOUT and BOUT of the driver chip 62 have the same amplitude, wavelength, frequency, and phase (or initial phase) as the signals output from the driver chip 61. In addition, in the driving control of the second actuator 6, the pulse signal is decimated to set a stop state, and the driving state and the stop state are repeated.

The signals input to the first actuator 8 and the second actuator 6 are not limited to those shown in FIGS. 6A and 6B, but a saw-tooth-wave signal or a triangle-wave signal, not a pulse signal, may be input to the actuators.

The second control unit 40 has the same structure as the first control unit 30. Signals having the same amplitude, wavelength, frequency, and phase (or initial phase) as the driving signals AOUT and BOUT of the driver chips 61 and 62 are input to the third actuator 10. In addition, the pulse signal is decimated to set a stop state. Therefore, the third actuator 10 is controlled to repeat the driving state and the stop state.

Next, the operation of the imaging apparatus according to this embodiment simultaneously performing hand shake correction and auto focusing will be described.

In FIG. 2, when hand shake occurs during the image capture of the imaging apparatus, the gyro sensor 50 detects a hand shake amount, and outputs a hand shake detection signal S1 to the first control unit 30. The first control unit 30 controls the hand shake correction circuit to calculate the driving signals Sx and Sy on the basis of the detection signal S1 of the gyro sensor 50 and the detection signals S2 of the Hall elements 15a and 15b such that the image captured by the imaging device 14 is not blurred. The CPU 60 outputs the input signals AIN and BIN with the same phase to the driver chips 61 and 62, respectively. The driver chips 61 and 62 receiving the signals output the driving signals AOUT and BOUT to the first piezoelectric element 8a of the first actuator 8 and the second piezoelectric element 6a of the second actuator 6, respectively. The piezoelectric elements 6a and 8a are expanded and contracted on the basis of the received driving signals AOUT and BOUT to move the imaging optical system 2 and the imaging device 14 relative to each other, thereby correcting the hand shake. In addition, in the second control unit 40, the same driving signals as those output from the driver chips 61 and 62 are input to the third piezoelectric element 10a of the third actuator 10, and the third piezoelectric element 10a is expanded and contracted on the basis of the driving signals AOUT and BOUT to move the imaging optical system 2 in the optical axis direction, thereby performing auto focusing.

When this driving control operation is performed, the driving signals AOUT and BOUT have the waveforms shown in FIGS. 8A to 8C. FIG. 8A shows the waveforms of the driving signals AOUT and BOUT of the first actuator 8, FIG. 8B shows the waveforms of the driving signals AOUT and BOUT of the second actuator 6, and FIG. 8C shows the waveforms of the driving signals AOUT and BOUT of the third actuator 10, in which the horizontal axis indicates time. As shown in FIGS. 8A to 8C, the pulse signals of the first actuator 8, the second actuator 6, and the third actuator 10 are decimated at different timings. That is, the first actuator 8, the second actuator 6, and the third actuator 10 enter the stop state at different timings. Specifically, after the stop state of the first actuator 8 ends, the second actuator 6 enters the stop state. After the stop state of the second actuator 6 ends, the third actuator 10 enters the stop state.

FIGS. 9A to 9D show current values corresponding to the driving signals AOUT and BOUT shown in FIGS. 8A to 8C. In FIGS. 9A to 9D, the horizontal axis indicates time. FIG. 9A shows the element current of the first actuator 8 and the power supply current of the power supply circuit 63 that supplies the element current. FIG. 9B shows the element current of the second actuator 6 and the power supply current of the power supply circuit 63 that supplies the element current. FIG. 9C shows the element current of the third actuator 10 and the power supply current of the power supply circuit 63 that supplies the element current. FIG. 9D shows the sum of the power supply currents of the power supply circuit 63. As shown in FIGS. 9A to 9C, since the first actuator 8, the second actuator 6, and the third actuator 10 enter the stop state at different timings, the three actuators use the power supply circuit 63 at different timings. Therefore, the power supply circuit 63 can reduce or prevent the situation that all of the actuators 6, 8, and 10 enter the stop state at the same time. In addition, the power supply circuit 63 can reduce or prevent the situation that all the actuators 6, 8, and 10 enter the driving state at the same time and a current is supplied to the actuators at the same time. As shown in FIG. 9D, it is possible to reduce the peak of the sum of the power supply currents to be less than a maximum supply current P. As such, it is possible to prevent a current value required for the power supply circuit 63 from being greater than the maximum supply current P of the power supply circuit 63, and it is possible to control the power supply circuit 63 to consume a substantially average current. Therefore, it is possible to stably perform an auto focusing operation and a hand shake correcting operation.

In contrast, the case in which the first actuator 8, the second actuator 6, and the third actuator 10 all enter the stop state at the same timing will be described below. FIG. 10A shows the waveforms of the driving signals AOUT and BOUT of the first actuator 8, FIG. 10B shows the waveforms of the driving signals AOUT and BOUT of the second actuator 6, and FIG. 10C shows the waveforms of the driving signals AOUT and BOUT of the third actuator 10, in which the horizontal axis indicates time. As such, the timings when the driving signals AOUT and BOUT of the first actuator 8, the driving signals AOUT and BOUT of the second actuator 6, and the driving signals AOUT and BOUT of the third actuator 10 are in the stop state overlap each other.

FIGS. 11A to 11D show current values corresponding to the driving signals AOUT and BOUT shown in FIGS. 10A to 10C. In FIGS. 11A to 11D, the horizontal axis indicates time. FIG. 11A shows the element current of the first actuator 8 and the power supply current of the power supply circuit 63 that supplies the element current. FIG. 11B shows the element current of the second actuator 6 and the power supply current of the power supply circuit 63 that supplies the element current. FIG. 11C shows the element current of the third actuator 10 and the power supply current of the power supply circuit 63 that supplies the element current. FIG. 11D shows the sum of the power supply currents of the power supply circuit 63. As shown in FIGS. 11A to 11C, since the timings when the first actuator 8, the second actuator 6, and the third actuator 10 are in the stop state overlap each other, the three actuators 6, 8, and 10 use the power supply circuit 63 at the same timing. Therefore, in the stop state, no current is consumed by the driving device. However, in the driving state, since the power supply circuit 63 supplies a current to all of the actuators 6, 8, and 10 at the same time, the instantaneous current consumed by the entire driving device is increased. In addition, the power supply circuit 63 needs to supply a current to all the actuators at the same time. Therefore, as shown in FIG. 11D, the peak of the sum of the power supply currents is greater than the maximum supply current P of the power supply circuit 63. As a result, the current consumption of the power supply circuit 63 becomes unstable, and the auto focusing operation and the hand shake correcting operation become unstable.

As described above, according to the imaging apparatus of this embodiment, the control units 30 and 40 supply the driving signals to the piezoelectric elements 6a, 8a, and 10a and controls the actuators 6, 8, and 10 to repeat the driving state and the stop state. In addition, the control units 30 and 40 control the actuators 6, 8, and 10 to enter the stop state at different timings. As such, since the actuators 6, 8, and 10 stop at different timings, it is possible to shift the use time of the power supply circuit 63, and thus reduce or prevent the situation that all of the actuators 6, 8, and 10 stop at the same time. In addition, it is possible to reduce or prevent the situation that all of the actuators 6, 8, and 10 are driven at the same time and a current is supplied to all the actuators at the same time. In this way, it is possible to prevent an increase in the maximum instantaneous current consumed by the entire driving device, and control the power supply to consume an average current. Therefore, it is possible to stably operate the plurality of actuators 6, 8, and 10. In addition, it is possible to reduce the maximum instantaneous current used for driving. Therefore, it is possible to simplify the structure of a driving circuit.

The above-described embodiment is just an example of the imaging apparatus according to the invention. The imaging apparatus according to the invention is not limited to that according to the above-described embodiment. However, the imaging apparatus according to the above-described embodiment may be modified within the range without departing from the scope and spirit of the invention, or the invention may be applied to other apparatuses.

For example, in the above-described embodiment, the hand shake correction mechanism moves the imaging optical system 2 relative to the imaging device 14 when hand shake occurs. However, the hand shake correction mechanism may move the imaging device 14 relative to the imaging optical system 2. In this case, it is also possible to obtain the same operation and effect as those in the imaging apparatus according to the above-described embodiment.

In the above-described embodiment, the first actuator 8 and the second actuator 6 are rotated forward. However, the first actuator 8 may be rotated forward, and the second actuator 6 may be rotated backward. In this case, it is also possible to obtain the same operation and effect as those in the imaging apparatus according to the above-described embodiment. In addition, the first actuator 8 may be rotated backward, and the second actuator 6 may be rotated forward. Alternatively, the first actuator 8 and the second actuator may be rotated backward.

In the above-described embodiment, three actuators are controlled. However, two actuators may be controlled. In addition, four or more actuators may be controlled. For example, the imaging apparatus according to the above-described embodiment may further include a fourth actuator that implements a variable power adjusting mechanism (zoom function), and the first actuator 8, the second actuator 6, the third actuator 10, and the zoom actuator may be controlled. In this case, as shown in FIGS. 12A to 12D, it is possible to shift the stop state of each of the actuators to prevent a current from being simultaneously supplied to all the actuators, and thus reduce the peak of the sum of the power supply currents. In addition, this structure makes it possible to drive a zoom lens and a focus lens at the same time. Therefore, it is possible to reduce an operation time.

In the above-described embodiment, the first actuator 8 is driven at the same time as the second actuator 6 enters the stop state, and the second actuator 6 is driven at the same time as the third actuator 10 enters the stop state. However, the actuators may not be operated at the same time. For example, the stop states of the actuators may partially overlap each other.

In the above-described embodiment, the driving signals AOUT and BOUT input to the piezoelectric elements 6a, 8a, and 10a of the actuators 6, 8, and 10 have the same phase. However, the driving signals may have different phases.

Figure 13:
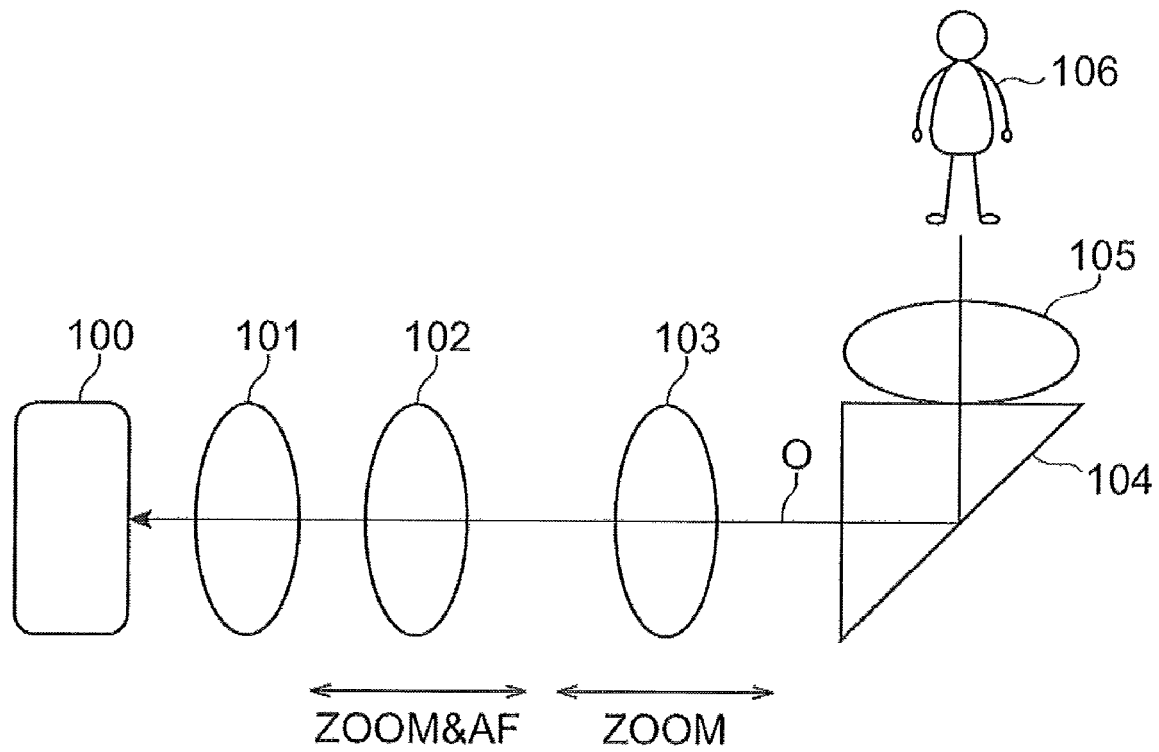
FIG. 13 is a block diagram illustrating the outline of the lens structure of another driving device.

In the above-described embodiment, the driving device is applied to the imaging apparatus having a hand shake correction mechanism. However, the driving device may be applied to an imaging apparatus including a zoom mechanism or an auto focus mechanism. For example, as shown in FIG. 13, the invention can be applied to an imaging apparatus including a moving lens 103 that can be driven by the first actuator 8 and a moving lens 102 that can be driven by the second actuator 6. For example, a bending-type optical system that deflects an optical axis O is applied to the imaging apparatus, and the imaging apparatus includes a fixed lens 105, a prism 104, the moving lenses 103 and 102, a fixed lens 101, and an imaging device 100. The first actuator 8 and the second actuator 6 are driven to move the moving lenses 103 and 102, thereby achieving a zoom function and an auto focus function. The image of a subject 106 incident from the fixed lens 105 passes through the prism 104 and is then deflected. Then, the image passes through the moving lens 103, the moving lens 102, and the fixed lens 101 and is then detected by the imaging device 100. As such, the invention can be applied to a hand shake correction mechanism, a zoom mechanism, an auto focus mechanism, or combinations thereof.

In the above-described embodiment, the piezoelectric element is used as the actuator of the imaging apparatus. However, other driving parts, such as a motor, a polymer actuator, and a shape memory alloy, may be used as the actuator.

In the above-described embodiment, the driving device is driven to move the optical system. However, the driving device may be driven to move a photoelectric conversion device, such as an imaging device.

In the above-described embodiment, the timing when each of the actuators enters the stop state is shifted such that the first actuator 8, the second actuator 6, and the third actuator 10 enter the stop state at different timings. However, the timing when each of the actuators starts to be driven may be shifted. That is, the driving device may be controlled such that the first actuator 8, the second actuator 6, and the third actuator 10 start to be driven at different timings. In this case, it is possible to obtain the same operation and effect as described above.

What is claimed is:

1. A driving device comprising:
a first actuator including a first piezoelectric element that is expanded and contracted in response to a driving signal and a first driving shaft that is attached to the first piezoelectric element and is reciprocated by the expansion and contraction operation of the first piezoelectric element, the first actuator moving a first driven member frictionally engaged with the first driving shaft;
a second actuator including a second piezoelectric element that is expanded and contracted in response to a driving signal and a second driving shaft that is attached to the second piezoelectric element and is reciprocated by the expansion and contraction operation of the second piezoelectric element, the second actuator moving a second driven member frictionally engaged with the second driving shaft; and
a driving signal control unit that supplies the driving signals to the first piezoelectric element and the second piezoelectric element such that each of the first actuator and the second actuator repeatedly changes its operational state between a driving state and a stop state,
wherein the driving signal control unit supplies the driving signals such that the first actuator and the second actuator start to be driven or stop at different timings.

2. An optical apparatus comprising:
the driving device according to claim 1; and
an optical member or a photoelectric conversion element that is driven by the driving device.

* * * * *